(12) United States Patent
Luick

(10) Patent No.: US 8,429,350 B2
(45) Date of Patent: Apr. 23, 2013

(54) CACHE LINE USE HISTORY BASED DONE BIT MODIFICATION TO D-CACHE REPLACEMENT SCHEME

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/405,572

(22) Filed: Feb. 27, 2012

(65) Prior Publication Data

US 2012/0159075 A1    Jun. 21, 2012

Related U.S. Application Data

(62) Division of application No. 12/473,358, filed on May 28, 2009.

(51) Int. Cl.
*G06F 12/08* (2006.01)

(52) U.S. Cl.
USPC .................................. 711/122; 711/E12.024

(58) Field of Classification Search .................. None
See application file for complete search history.

(56) References Cited

U.S. PATENT DOCUMENTS

| | | | |
|---|---|---|---|
| 6,314,493 B1 | 11/2001 | Luick | |
| 6,338,120 B1 | 1/2002 | Hanley | |
| 6,877,069 B2 | 4/2005 | Luick | |
| 6,965,962 B2 | 11/2005 | Sheaffer | |
| 7,099,999 B2 | 8/2006 | Luick | |
| 7,219,185 B2 | 5/2007 | Luick | |
| 7,237,094 B2 | 6/2007 | Curran et al. | |
| 7,447,879 B2 | 11/2008 | Luick | |
| 2001/0029573 A1 | 10/2001 | Johnson | |
| 2004/0034740 A1 | 2/2004 | Britton et al. | |
| 2004/0059891 A1 | 3/2004 | Luick | |
| 2006/0112233 A1* | 5/2006 | Hu et al. ........................ | 711/138 |
| 2007/0186049 A1 | 8/2007 | Luick | |
| 2007/0186050 A1* | 8/2007 | Luick ............................ | 711/137 |
| 2007/0186073 A1 | 8/2007 | Luick | |
| 2008/0016297 A1 | 1/2008 | Bartley et al. | |
| 2008/0086598 A1 | 4/2008 | Maron et al. | |
| 2008/0086599 A1 | 4/2008 | Maron et al. | |
| 2008/0141253 A1 | 6/2008 | Luick | |
| 2008/0177951 A1 | 7/2008 | Bartley et al. | |
| 2009/0006768 A1 | 1/2009 | Luick | |
| 2009/0006803 A1 | 1/2009 | Luick | |
| 2009/0006812 A1 | 1/2009 | Luick | |
| 2010/0306471 A1 | 12/2010 | Luick | |
| 2010/0306472 A1 | 12/2010 | Luick | |
| 2010/0306473 A1 | 12/2010 | Luick | |
| 2010/0306474 A1* | 12/2010 | Luick ............................ | 711/122 |

OTHER PUBLICATIONS

U.S. Appl. No. 12/473,337; Non-Final Office Action; filed May 28, 2009; Date Mailed: Sep. 12, 2011.
U.S. Appl. No. 12/473358; Non-Final Office Action; filed May 28, 2009; Date Mailed: Oct. 19, 2011.
U.S. Appl. No. 12/473,365; Non-Final Office Action; filed May 28, 2009; Date Mailed: Sep. 26, 2011.
U.S. Appl. No. 12/473,328; Non-Final Office Action; filed May 28, 2009; Date Mailed: Sep. 2, 2011.

* cited by examiner

*Primary Examiner* — Denise Tran
(74) *Attorney, Agent, or Firm* — Cantor Colburn LLP

(57) ABSTRACT

A method of providing history based done logic includes receiving a cache line in a L2 cache; determining if the cache line has a history of access at least three times on a previous call into the L2 cache; providing the cache line directly to a processor if the history of access was less then the at least three times; and loading the cache line into an L1 cache if the history of access was the at least three times.

4 Claims, 4 Drawing Sheets

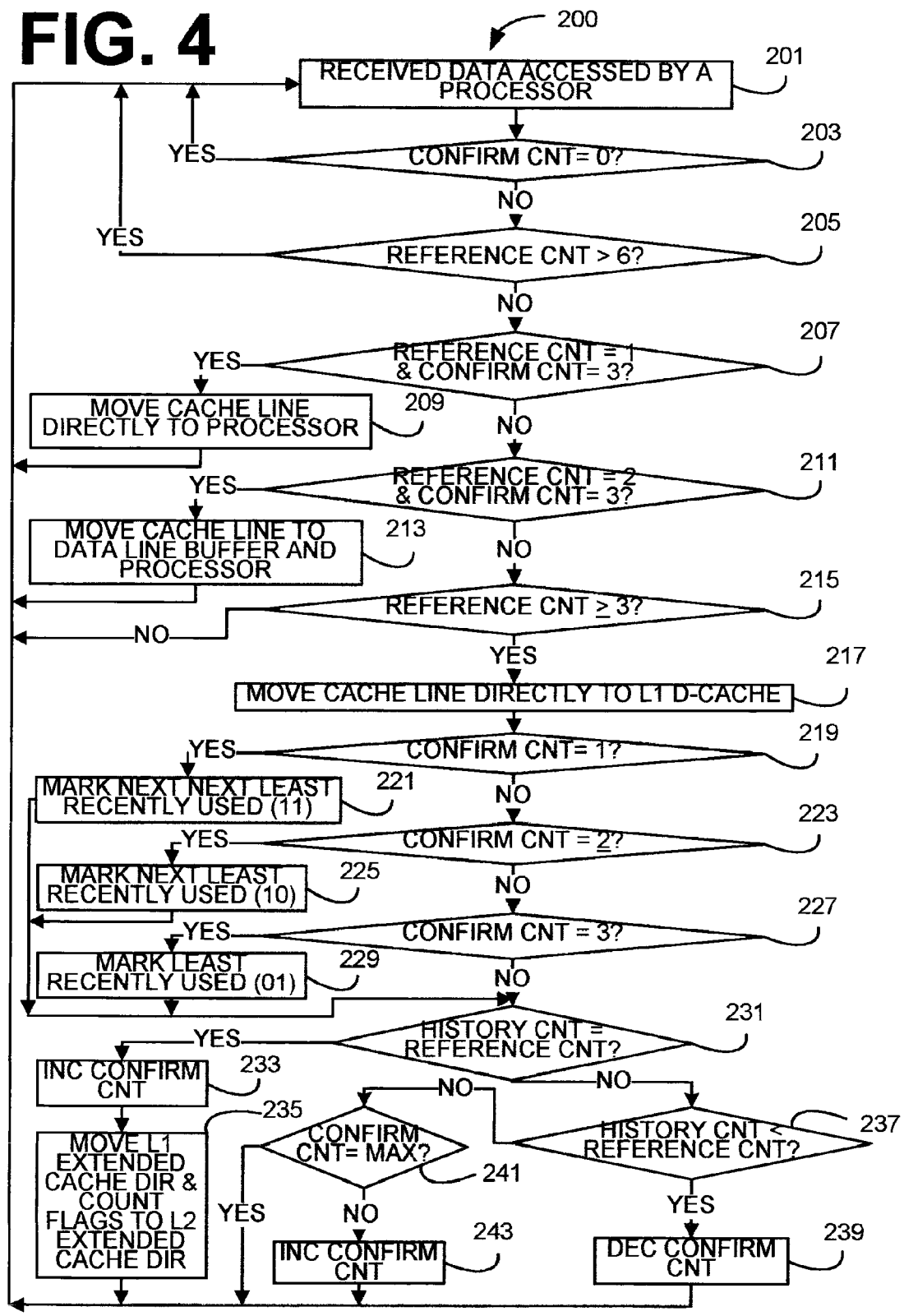

CACHE LINE USE HISTORY BASED DONE BIT MODIFICATION TO D-CACHE REPLACEMENT SCHEME

CROSS-REFERENCE TO RELATED APPLICATION

This application is a divisional of U.S. patent application Ser. No. 12/473,358, filed May 28, 2009, the disclosure of which is incorporated by reference herein in its entirety.

BACKGROUND

The present invention generally relates to controlling cache entries in a cache memory and, more specifically, to providing an improved cache replacement mechanism and method.

Currently, modern computer systems typically contain several integrated circuits (ICs), including a processor which may be used to process information in the computer system. The data processed by a processor may include computer instructions which are executed by the processor, as well as data which is manipulated by the processor using the computer instructions. The computer instructions and data are typically stored in a main memory in the computer system.

Processors typically process instructions by executing the instruction in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction. In some cases, the pipeline (in addition to other circuitry) may be placed in a portion of the processor referred to as the processor core. Some processors may have multiple processor cores, and in some cases, each processor core may have multiple pipelines. Where a processor core has multiple pipelines, groups of instructions (referred to as issue groups) may be issued to the multiple pipelines in parallel and executed by each of the pipelines in parallel.

As an example of executing instructions in a pipeline, when a first instruction is received, a first pipeline stage may process a small part of the instruction. When the first pipeline stage has finished processing the small part of the instruction, a second pipeline stage may begin processing another small part of the first instruction while the first pipeline stage receives and begins processing a small part of a second instruction. Thus, the processor may process two or more instructions at the same time (in parallel).

To provide for faster access to data and instructions as well as better utilization of the processor, the processor may have several caches. A cache is a memory which is typically smaller than the main memory and is typically manufactured on the same die (i.e., chip) as the processor. Modern processors typically have several levels of caches. The fastest cache which is located closest to the core of the processor is referred to as the Level 1 cache (L1 cache). In addition to the L1 cache, the processor typically has a second, larger cache, referred to as the Level 2 cache (L2 cache). In some cases, the processor may have other, additional cache levels (e.g., an L3 cache and an L4 cache).

To provide the processor with enough instructions to fill each stage of the processor's pipeline, the processor may retrieve instructions from the L2 cache in a group containing multiple instructions, referred to as an instruction line (I-line). The retrieved I-line may be placed in the L1 instruction cache (I-cache) where the core of the processor may access instructions in the I-line. Blocks of data (D-lines) to be processed by the processor may similarly be retrieved from the L2 cache and placed in the L1 cache data cache (D-cache).

The process of retrieving information from higher cache levels and placing the information in lower cache levels may be referred to as fetching, and typically requires a certain amount of time (latency). For instance, if the processor core requests information and the information is not in the L1 cache (referred to as a cache miss), the information may be fetched from the L2 cache. Each cache miss results in additional latency as the next cache/memory level is searched for the requested information. For example, if the requested information is not in the L2 cache, the processor may look for the information in an L3 cache or in main memory.

The implementation of a cache is normally accomplished through three major portions: directory, arrays and control. The directory contains the address identifiers for the cache line entries, plus other necessary status tags suitable for particular implementations. The cache arrays store the actual data bits, with additional bits for parity checking or for error correction as required in particular implementations. Cache control circuits provide necessary logic for the management of cache contents and accessing. Upon an access to the cache, the directory is accessed or "looked up" to identify the residence of the requested data line. A cache hit results if it is found in the cache, and a cache miss results otherwise. Upon a cache hit, the data may be accessed from the array if there is no prohibiting condition, e.g., protection violation. Upon a cache miss, the data line is normally fetched from the bulk memory and inserted into the cache first, with the directory updated accordingly, in order to satisfy the access through the cache.

Since a cache only has capacity for a limited number of line entries and is relatively small compared with the bulk memory, replacement of existing line entries is often needed. The replacement of cache entries in a set associative cache is normally based on algorithms such as the Least Recently Used (LRU) scheme. That is, when a cache line entry needs to be removed to make room for, i.e., replaced by, a new line, the line entry that was least recently accessed will be selected.

One of the problems with the LRU scheme of replacing cache entries is determining when a line entry is the least recently used cache entry. There are numerous methods to make this determination; however, some inefficiencies will still exist. Accordingly, there is a need for improved methods and apparatus for determining when a line entry in a cached memory will no longer be accessed in the near future and therefore is available to be replaced.

SUMMARY

In an exemplary embodiment, a method of providing history based done logic includes receiving a cache line in a L2 cache; determining if the cache line has a history of access at least three times on a previous call into the L2 cache; providing the cache line directly to a processor if the history of access was less then the at least three times; and loading the cache line into an L1 cache if the history of access was the at least three times.

In another embodiment, an integrated circuit device includes a processor core; a level one cache; a level two cache; and a history count in the level one cache for indicating a number of load references to the cache line a last time the cache line was called in to the level one cache.

In still another embodiment, a processor device includes a level one cache; a level two cache; and circuitry configured to receive a cache line in a L2 cache, determine if the cache line has a history of access at least three times on a previous call into the L2 cache, provide the cache line directly to a processor if the history of access was less then the at least three times; and load the cache line into an L1 cache if the history of access was the at least three times.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 is a flow chart illustrating an example of the operation of a history based done bit process replacement scheme according to one embodiment of the invention.

Figure 1:
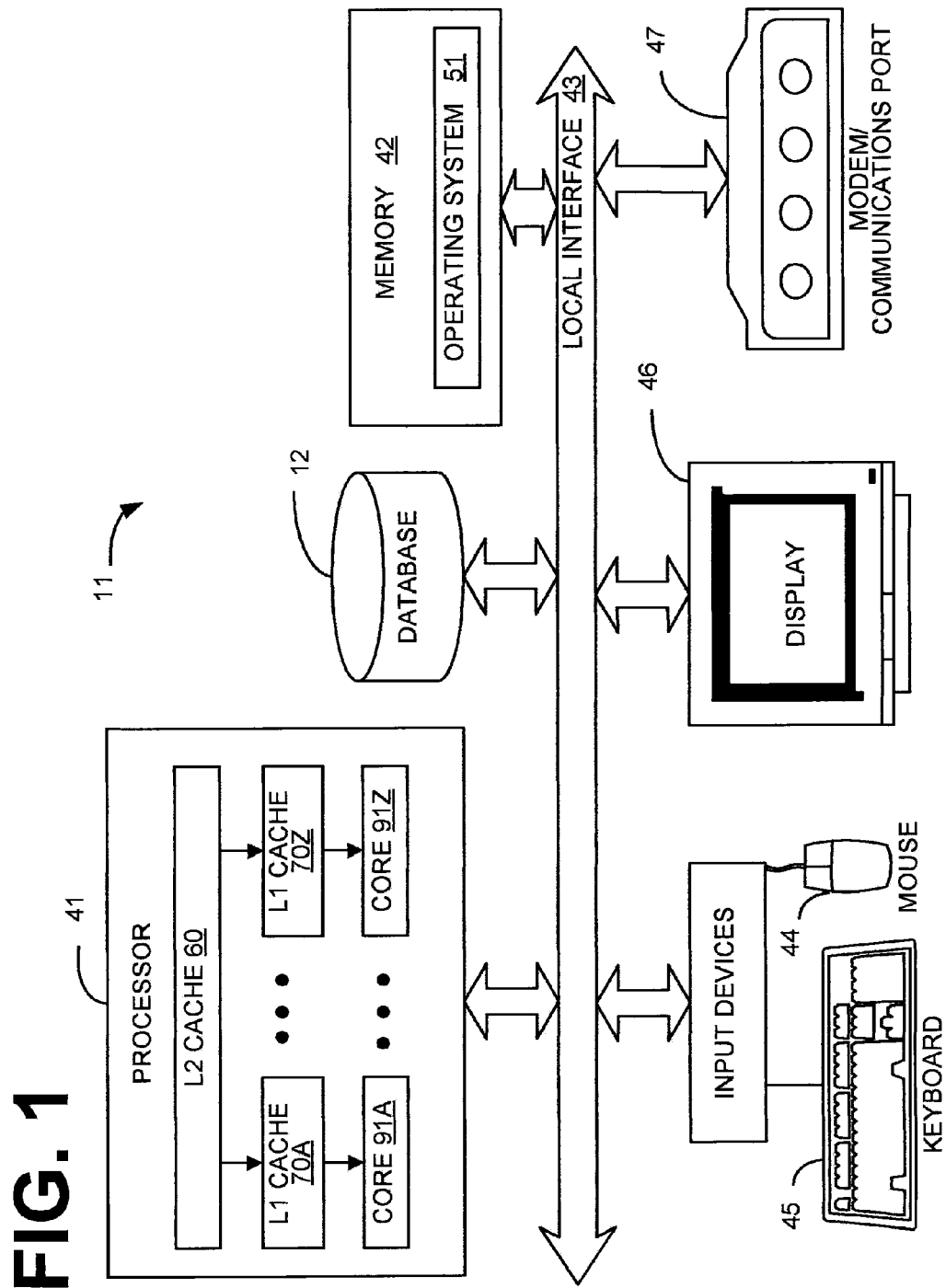
FIG. 1 is a block diagram depicting a computing system according to one embodiment of the invention.

The detailed description explains the preferred embodiments of the invention, together with advantages and features, by way of example with reference to the drawings.

DETAILED DESCRIPTION

The use of data caches for performance improvements in computing systems is well known and extensively used. A cache is a high-speed buffer which holds recently used memory data. Due to the locality of references nature for programs, most of the access of data may be accomplished in a cache, in which case slower accessing to bulk memory can be avoided. In typical high performance processor designs, the cache access path forms a critical path. That is, the cycle time of the processor is affected by how fast cache accessing can be carried out.

In order to facilitate efficient implementations, a cache is normally structured as a 2-dimensional table. The number of columns is called the set-associativity, and each row is called a congruence class. For each data access, a congruence class is selected using certain address bits of the access and the data may be accessed at one of the line entries in the selected congruence class if it hits there. It is usually too slow to have the cache directory searched first, e.g., with parallel address compares, to identify the set position (within the associated congruence class) and then to have the data accessed from the arrays at the found location. Such sequential processing normally requires two successive machine cycles to perform, which degrades processor performance significantly.

By executing the instruction in the delayed execution pipeline, and by initiating the L2 cache access when the instruction is issued, the data targeted by the instruction may be retrieved, if necessary, from the L2 cache in time for the instruction to use the data without stalling execution of the instruction.

The present invention embodiments generally provide an improved cache replacement mechanism and method. In one embodiment, a history count is kept for each cache line indicating the number of load references to that line in the last time that cache line was called into a level of cache. The improved cache replacement mechanism and method compares a history count to the current count by the D-cache line being replaced and increments a confirmation count if equal, and then moves to the L1 extend cache directory and to the L2 cache directory. If the history count is less than the current count, then the method decrements the confirmation count. However, if the history count is greater than or equal to the current count, then the method increments the confirmation counter to a maximum count.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in the claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, Internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module).

While described below with respect to a processor having multiple processor cores and multiple L1 caches, wherein each processor core uses multiple pipelines to execute instructions, embodiments of the invention may be utilized with any processor which utilizes a cache, including processors which have a single processing core. In general, embodiments of the invention may be utilized with any processor and are not limited to any specific configuration. Furthermore, while described below with respect to a processor having an L1-cache that is divided into an L1 instruction cache (L1 I-cache, or I-cache) and an L1 data cache (L1 D-cache, or D-cache), embodiments of the invention may be utilized in configurations wherein a unified L1 cache is utilized.

FIG. 1 is a block diagram illustrating an example of a computing system 11 suitable for implementing the history based done bit process replacement method of the present invention. System 11 includes, but is not limited to, PCs, workstations, laptops, PDAs, palm devices and the like. Generally, in terms of hardware architecture, as shown in FIG. 1, the system 11 includes a processor 41, memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the system 11, and a semiconductor based microprocessor (in the form of a microchip) or a macroprocessor. Examples of suitable commercially available microprocessors are as follows: a PowerPC microprocessor from IBM, U.S.A., an 80x86 or Pentium series microprocessor from Intel Corporation, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 42 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. The memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 1, the software in the memory 42 includes a suitable operating system (O/S) 51. The operating system 51 essentially controls the execution of other computer programs, and provides scheduling, input-output control, file and data management, memory management, and communication control and related services.

A non-exhaustive list of examples of suitable commercially available operating systems 51 is as follows: a Windows operating system available from Microsoft Corporation; a Netware operating system available from Novell, Inc.; a Macintosh operating system available from Apple Computer, Inc.; a UNIX operating system, which is available for purchase from many vendors, such as the Hewlett-Packard Company, Sun Microsystems, Inc., and AT&T Corporation; a Linux operating system, which is freeware that is readily available on the Internet; a run time Vxworks operating system from WindRiver Systems, Inc.; or an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation).

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the computing system 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the system 11 is activated.

When the system 11 is in operation, the processor 41 is configured to execute software stored within the memory 42, to communicate data to and from the memory 42, and to generally control operations of the system 11 are pursuant to the software. The O/S 51 and any other program are read, in whole or in part, by the processor 41, perhaps buffered within the processor 41, and then executed.

According to one embodiment of the invention, the processor 41 may have an L2 cache 60 as well as multiple L1 caches 70, with each L1 cache 70 being utilized by one of multiple processor cores 91. According to one embodiment, each processor core 91 may be pipelined, wherein each instruction is performed in a series of small steps with each step being performed by a different pipeline stage.

Figure 2:
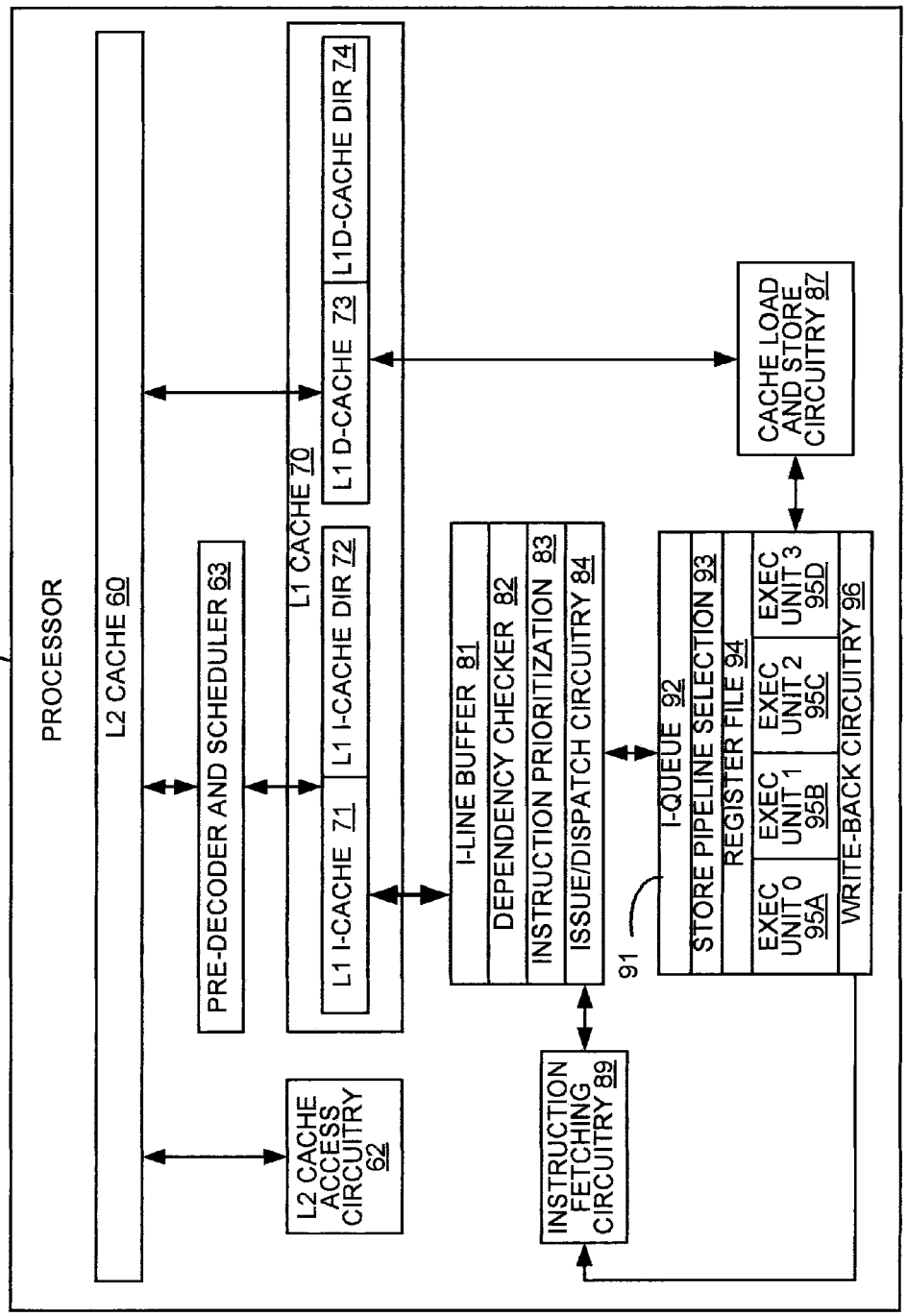
FIG. 2 is a block diagram depicting a computer processor according to one embodiment of the invention.

FIG. 2 is a block diagram depicting a processor 41 according to one embodiment of the invention. For simplicity, FIG. 2 depicts and is described with respect to a single processor core 91 of the processor 41. In one embodiment, each processor core 91 may be identical (e.g., contain identical pipelines with identical pipeline stages). In another embodiment, each processor core 91 may be different (e.g., contain different pipelines with different stages).

In one embodiment of the invention, the L2 cache 60 may contain a portion of the instructions and data being used by the processor 41. In some cases, the processor 41 may request instructions and data which are not contained in the L2 cache 60. Where requested instructions and data are not contained in the L2 cache 60, the requested instructions and data may be retrieved (either from a higher level cache or system memory 42) and placed in the L2 cache. When the processor core 91 requests instructions from the L2 cache 60, the instructions may be first processed by a predecoder and scheduler 63 (described below in greater detail).

In one embodiment of the invention, instructions may be fetched from the L2 cache 60 in groups, referred to as Mines. Similarly, data may be fetched from the L2 cache 60 in groups referred to as D-lines. The L1 cache 70 depicted in FIG. 1 may be divided into four parts, an L1 instruction cache, which includes L1 I-cache 71 and an L1 I-cache directory 72 for storing I-lines, as well as an L1 data cache which includes L1 D-cache 73 and an L1 D-cache directory 74 for storing D-lines. I-lines and D-lines may be fetched from the L2 cache 60 using L2 access circuitry 62.

In one embodiment of the invention, I-lines retrieved from the L2 cache 60 may be processed by a predecoder and scheduler 63 and the Mines may be placed in the L1 I-cache 71. To further improve processor performance, instructions are often predecoded, for example, I-lines are retrieved from L2 (or higher) cache. Such predecoding may include various functions, such as address generation, branch prediction, and scheduling (determining an order in which the instructions should be issued), which is captured as dispatch information (a set of flags) that control instruction execution. In some cases, the predecoder and scheduler 63 may be shared among multiple processor cores 91 and L1 caches 70. Similarly, D-lines fetched from the L2 cache 60 may be placed in the D-cache L1. A bit in each I-line and D-line may be used to track whether a line of information in the L2 cache 60 is an I-line or D-line. Optionally, instead of fetching data from the L2 cache 60 in I-lines and/or D-lines, data may be fetched from the L2 cache 60 in other manners, e.g., by fetching smaller, larger, or variable amounts of data.

In one embodiment, the L1 I-cache 71 and L1 D-cache 73 may have an L1 I-cache directory 72 and an L1 D-cache directory 74, respectively, to track which Mines and D-lines are currently in the L1 I-cache 71 and L1 D-cache 73. When an Mine or D-line is added to the L1 I-cache 71 or L1 D-cache 73, a corresponding entry may be placed in the L1 I-cache directory 72 or L1 D-cache directory 74. When an Mine or D-line is removed from the L1 I-cache 71 or L1 D-cache 73, the corresponding entry in the L1 I-cache directory 72 or L1 D-cache directory 74 may be removed. While described below with respect to a L1 D-cache 73 which utilizes an L1 D-cache directory 74, embodiments of the invention may also be utilized where an L1 D-cache directory 74 is not utilized In such cases, the data stored in the L1 D-cache 73 itself may indicate what D-lines are present in the L1 D-cache 73.

In one embodiment, instruction fetching circuitry 89 may be used to fetch instructions for the processor core 91. For example, the instruction fetching circuitry 89 may contain a program counter which tracks the current instructions being executed in the core. A branch unit within the core may be used to change the program counter when a branch instruction is encountered.

An Mine buffer 81 may be used to store instructions fetched from the L1 I-cache 71. The instructions from the I-line buffer 81 are then loaded into a dependency checker 82. The dependency checker 82 determines any dependency issues for each group of instructions acquired from the Mine buffer 81. Instruction prioritization circuitry 83 may be used for optimizations which may be achieved from the reordering of instructions. The instruction prioritization circuitry 83 can implement any number of different instruction optimization schemes, which is to first prioritize the instructions according to instruction type. The reordering of instructions should be in line with those instructions having dependency issues determined in a dependency checker 82.

Issue and dispatch circuitry 84 may be used to group instructions retrieved from the instruction prioritization circuitry 83 into instruction groups which may then be issued to the processor core 91 as described below. In some cases, the issue and dispatch circuitry 84 may use information provided by the predecoder and scheduler 63 to form appropriate instruction groups. In some other cases, the issue and dispatch circuitry 84 may use the instruction dependency information turn generated by a dependency checker 82 to form appropriate instruction groups.

In addition to receiving instructions from the issue and dispatch circuitry 84, the processor core 91 may receive data from a variety of locations. Where the processor core 91 requires data from a data register, a register file 94 may be used to obtain data. Where the processor core 91 requires data from a memory location, cache load and store circuitry 87 may be used to load data from the L1 D-cache 73. Where such a load is performed, a request for the required data may be issued to the L1 D-cache 73. At the same time, the L1 D-cache directory 74 may be checked to determine whether the desired data is located in the L1 D-cache 73. Where the L1 D-cache 73 contains the desired data, the L1 D-cache directory 74 may indicate that the L1 D-cache 73 contains the desired data and the D-cache access may be completed at some time afterwards. Where the L1 D-cache 73 does not contain the desired data, the L1 D-cache directory 74 may indicate that the L1 D-cache 73 does not contain the desired data. Because the L1 D-cache directory 74 may be accessed more quickly than the L1 D-cache 73, a request for the desired data may be issued to the L2 cache 60 (e.g., using the L2 access circuitry 62) after the L1 D-cache directory 74 is accessed but before the D-cache access is completed.

In some cases, data may be modified in the processor core 91. Modified data may be written to the register file 94, or stored in memory 42 (FIG. 1). Write-back circuitry 88 may be used to write data back to the register file 94. In some cases, the write-back circuitry 88 may utilize the cache load and store circuitry 87 to write data back to the L1 D-cache 73. Optionally, the processor core 91 may access the cache load and store circuitry 87 directly to perform stores. In some cases, as described below, the write-back circuitry 88 may also be used to write instructions back to the L1 I-cache 71.

As described above, the issue and dispatch circuitry 84 may be used to form instruction groups and issue the formed instruction groups to the processor core 91. The issue and dispatch circuitry 84 may also include circuitry to rotate and merge instructions in the Mine and thereby form an appropriate instruction group. Formation of issue groups may take into account several considerations, such as dependencies between the instructions in an issue group. Once an issue group is formed, the issue group may be dispatched in parallel to the processor core 91. In some cases, an instruction group may contain one instruction for each pipeline in the processor core 91. Optionally, the instruction group may a smaller number of instructions.

One or more processor cores 91 may utilize a cascaded, delayed execution pipeline configuration. In the example depicted in FIG. 2, the processor core 91 contains four pipelines, i.e. execution units 95A-95D. Optionally, a smaller number (two or more execution units 95) or a larger number (more than four execution units 95) may be used in such a configuration. Furthermore, the physical layout depicted in FIG. 2 is exemplary, and not necessarily suggestive of an actual physical layout of the execution pipeline unit.

The execution units 95 may include several pipeline stages which perform one or more functions for a given pipeline. For example, the execution unit 95 may perform all or a portion of the fetching and decoding of an instruction. The decoding performed by the execution unit 95 may be shared with a predecoder and scheduler 63 which is shared among multiple processor cores 91 or, optionally, which is utilized by a single processor core 91. The execution unit may also read data from a register file 94, calculate addresses, perform integer arithmetic functions (e.g., using an arithmetic logic unit, or ALU), perform floating point and arithmetic functions, execute instruction branches, perform data access functions (e.g., loads and stores from memory), and store data back to registers (e.g., in the register file 94). In some cases, the processor core 91 may utilize an instruction fetching circuitry 89, store pipelines selection queue 93, the register file 94, cache load and store circuitry 87, and write-back circuitry 96, as well as any other circuitry, to perform these functions.

Each execution unit 95 may perform the same functions. Optionally, each execution unit 95 (or different groups of execution units) may perform different sets of functions. Also, in some cases the execution units 95 in each processor core 91 may be the same or different from execution units 95 provided in other cores. For example, in one core, execution units 95A and 95C may perform load/store and arithmetic functions while execution units 95B and 95D may perform only arithmetic functions.

Execution in the execution units 95 may be performed in a delayed manner with respect to the other execution units 95. For example, instruction I0 may be executed first in the execution unit 95A, instruction I1 may be executed second in the execution unit 95B, and so on.

Upon issuing the instruction issue group to the processor core 91, I0 may be executed immediately in execution unit 95A. Later, after instruction I0 has finished being executed in execution unit 95A, execution unit 95B, may begin executing instruction I1, and so on, such that the instructions issued in parallel to the processor core 91 are executed in a delayed manner with respect to each other.

Some execution units 95 may be delayed with respect to each other while other execution units 95 are not delayed with respect to each other. Where execution of a second instruction is dependent on the execution of a first instruction, forwarding paths may be used to forward the result from the first instruction to the second instruction. The processor core 91 may contain more forwarding paths from different points in an execution unit 95 to other execution units 95 or to the same execution unit 95.

Instructions which are not being executed by an execution unit 95 (e.g., instructions being delayed) may be held in a delay I-queue 92 or a store pipelines selection queue 93. The delay I-queues 92 may be used to hold instructions in an instruction group which have not been executed by an execution unit 95. For example, while instruction I0 is being executed in execution unit 95A, instructions I1, I2, and I3 may be held in the store pipelines selection queue 93. Once the instructions have moved through the store pipelines selection queue 93, the instructions may be issued to the appropriate execution unit 95 and executed. The store pipelines selection queue 93 may be used to hold the results of instructions which have already been executed by an execution unit 95. In some cases, results in the store pipelines selection queue 93 may be forwarded to executions units 95 for processing or invalidated where appropriate. Similarly, in some circumstances, instructions in the delay I-queue 92 may be invalidated, as described below.

After each of the instructions in an instruction group have passed through the delay I-queue 92, store pipelines selection queue 93, and execution units 95, the results (e.g., data, and, as described below, instructions) may be written back either to the register file 94 or the L1 I-cache 71 and/or L1 D-cache 73. In some cases, the write-back circuitry 96 may be used to write back the most recently modified value of a register and discard invalidated results.

Figure 3:
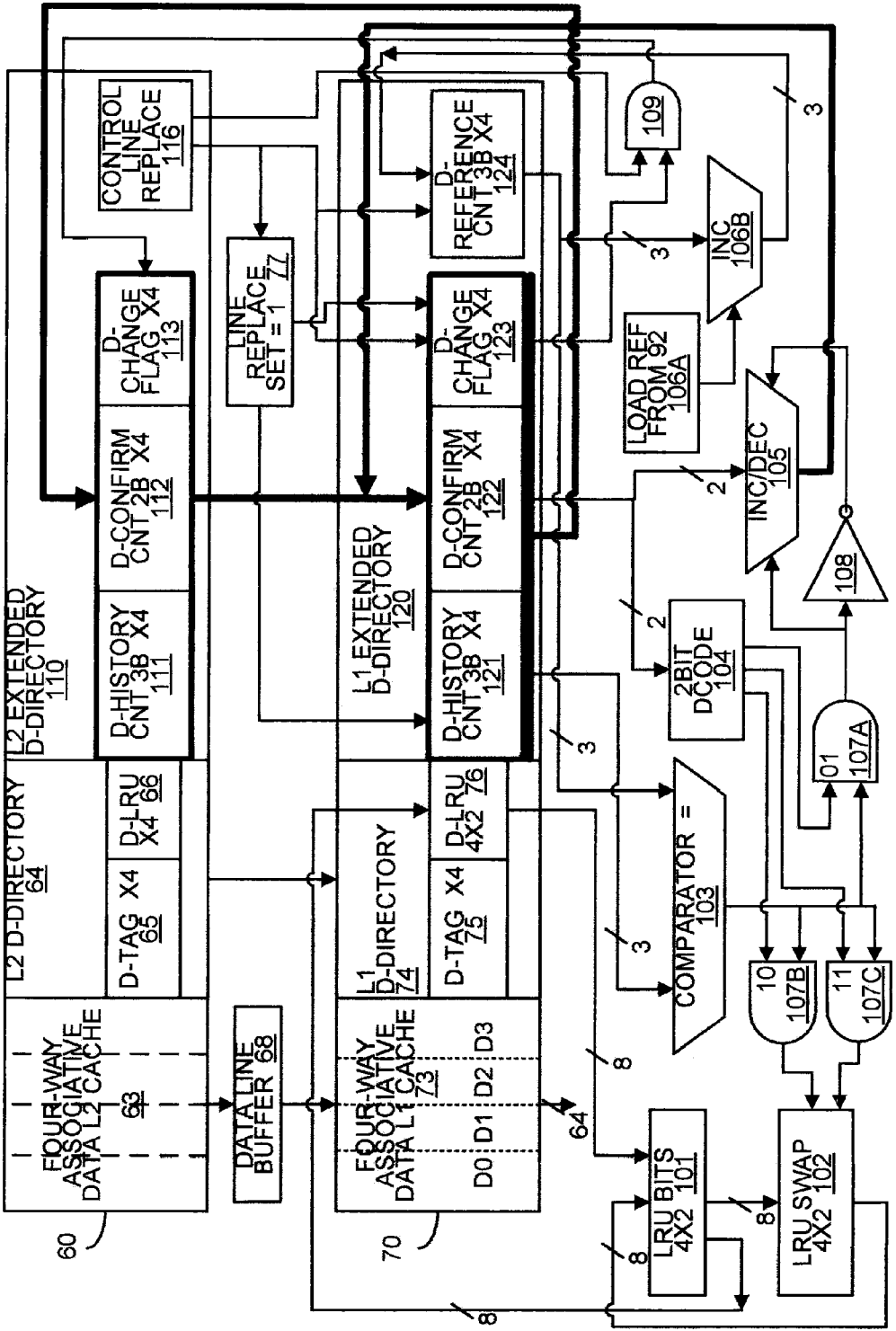
FIG. 3 is a block diagram depicting one of the cores of the L1 and L2 caches according to one embodiment of the invention.

FIG. 3 is a block diagram depicting the cores of the L1 cache 70 and L2 cache 60 according to one embodiment of the invention. A history count is kept for each cache line indicating the number of load references to that line the last time the cache line was called into a level of cache. In the L2 cache 60 is the L2 extended D-directory 110 and in L1 cache 70 is the L1 extended D-directory 120, wherein both include additional flag bits that are added to each line to improve the least recently used replacement scheme.

As shown, the L2 extended D-directory 110 includes, but is not limited to, additional fields including an L2 D-history count 111, an L2 D-confirmation count 112, an L2 D-change flag 113, and control line replace 116. The L1 extended D-directory 120 includes, but is not limited to, additional fields including an L1 D-history count 121, an L1 D-confirmation count 122, an L1 D-change flag 123 and an L1 D-reference count 124. When a data cache line is moved from L2 cache 60 to L1 cache 70, the D-history count 111, D-confirmation count 112 and D-change flag 113 information for that data cache line are moved into the L1 extended D-directory 120 with the data cache line.

The control line replace 116 is utilized to set line replace 77 to D-history count 121. The control line replace 116 is also input into AND gate 109 to change the D-change flag 113 in L2 extended D-directory 110. An L1 D-history count 121 and L2 D-history count 111 are kept for each cache line indicating the number of load references that each line had the previous instantiation of the associated cache line into the L1 D-cache 73. A L1 D-reference count 124 is also kept in the L1 extended D-directory 120 to count the load references during the current installation of the cache line in the L1 D-cache 73. Upon each load references, the incrementor/decrementor 105 increments the reference count in the L1 D-reference count 124.

A reliability value (confirmation count) is also kept to indicate the reliability of the estimate that a line marked as least recently used. The L1 D-history count 121 and L1 D-reference count 124 are compared using comparator 103 on each load reference. The output of the comparator 103 is combined with the output a two bit decode 104. The outputs of comparator 103 and a decode 104 are then ANDed together to produce a control signals using and gates 107A, 107B and 107C. When the output of comparator 103 is equal to 01, the AND gate 107A produces a signal that controls the incrementor/decrementor 105 to perform the increment function. Else, when the output of comparator 103 is not equal to 01, and the output of and gate 107A is zero or Null, the inverter 108 create a control signal to decrement the D-confirmation count 122 output that is loaded back into the D-confirmation count 122.

If the L1 D-history count 121 is greater than or equal to the L1 D-reference count 124, then the L1 D-confirmation count 122 is incremented to a maximum count. Once than L1 D-confirmation count 122 reaches a maximum count, it is no longer incremented.

If the L1 D-history count 121 is less than the L1 D-reference count 124, then the history based done bit cache replacement mechanism decrements the L1 D-confirmation count 122 using incrementor/decrementor 105. However, if the L1 D-history count 121 is greater than or equal to the L1 D-reference count 124, then the history based done bit cache replacement mechanism increments the L1 D-confirmation count 122 to a maximum count using incrementor/decrementor 105. In one embodiment, the L1 D-confirmation count 122 is a saturating counter that does not increment past 11.

In one embodiment, when the L1 D-confirmation count 122 is set to zero (i.e., 00), then the L1 cache 70 has no least recently used cache changes. When the L1 D-confirmation count 122 is set to 1 (i.e., 01), then the L1 cache 70 puts the missing D-cache line into L1 D-cache 73 and marks the cache line next next least recently used (NNLRU). When the L1 D-confirmation count 122 is set to 2 (i.e., 10), then the L1 cache 70 puts the missing D-cache line into L1 D-cache 73 and marks the cache line next least recently used (NLRU). When the L1 D-confirmation count 122 is set to 3 (i.e., 11), then the L1 cache 70 puts the missing D-cache line into L1 D-cache 73 and marks the cache line next least recently used (LRU).

In another embodiment, if it is known that a cache line is used only once or twice, the cache line is loaded without being cached in the L1 cache 70 using data line buffer 68. If the cache line is use only once, the cache line bypasses the L1 cache 70 and the data is used by the core 91. If the cache line is reliably used twice, the L1 cache 70 is bypassed and is used immediately by the core 91, and the second data access is subsequently used from the data line buffer 68.

The D-reference count 124 is also loaded into the incrementor 106B on each reference of the data cache line in order to reflect the number of reference of that data cache line. Upon the initial load of a data cache line from the I-queue 92, the reference count is set to one utilizing load reference 106A. In another embodiment, the L2 extended D-directory 110 includes a D-change flag 113 and the L1 extended D-directory with 120 includes the D-change flag 123.

FIG. 4 is a flow chart illustrating an example of the operation of a cache line use of a history based done bit process replacement scheme 200 according to one embodiment of the invention.

History base done bit process replacement scheme 200 waits to receive data accessed by core 91 at block 201. Once the data requested by core 91 is received, it is determined if the confirmation count of the data accessed by core 91 is equal to zero, at decision block 203. If it is determined in decision block 203 that the data accessed has a confirmation count equal to zero, then there are no cache changes and the history based done bit process replacement scheme 200 returns to block 201.

However, if it is determined that the confirmation count of the data accessed has a confirmation count greater than zero, then it is determined if the reference count of the data accessed by core 91 is greater than six at decision block 205. If it is determined in decision block 205 that the data accessed has a reference count greater than six, then there are no cache changes to be made and the history based done bit process replacement scheme 200 returns to block 201.

However, if it is determined in decision block 205 that the reference count is less than or equal to six, then it is determined if the reference count is equal to one and a confirmation count is equal to three for the data accessed by core 91, at decision block 207. If it is determined at decision block 207 that the reference count is not equal to one or the confirmation count is not equal to three, then the history based done bit process replacement scheme 200 skips to decision block 211. However, if it is determined at decision block 207 that the reference count is equal to one and a confirmation count is equal to three, then the history based done bit process replacement scheme 200 moves the data from cache line directly into the requesting core 91, at block 209. The data from the cache line is loaded directly to the requesting core 91 because it is believed that it is only a one time access by core 91, and therefore bypasses the L1 cache 70. The history based done bit process replacement scheme 200 returns to block 201.

At decision block 211, it is determined if the reference count is equal to two and a confirmation count is equal to three for the data accessed by core 91. If it is determined at decision block 211 that the reference count is not equal to two or the confirmation count is not equal to three, then the history based done bit process replacement scheme 200 skips to decision block 215. However, if it is determined at decision block 211 that the reference count is equal to two and a confirmation count is equal to three, then the history based done bit process replacement scheme 200 moves the data from cache line to the data line buffer 68 and directly into the requesting core 91, at block 213. The data from the cache line is loaded directly to the requesting core 91 and data line buffer because it is believed that it is only a two time access by core 91, and therefore bypasses the L1 cache 70. The history based done bit process replacement scheme 200 returns to block 201.

At decision block 215, it is determined if the received data referenced as a reference count greater than or equal to three. If it is determined at decision block 215 that the reference count is not greater than or equal to three, and the history based done bit process replacement scheme 200 assumes that the reference count is only one or two times and therefore is not worth the overhead of placing it in the L1 D-cache 73 and returns to block 201. However, if it is determined at decision block 215 at the reference count is greater than or equal to three, then the data from the cache line is placed into the L1 D-cache 73 at block 217.

Next, at decision block 219, it is determined if the confirmation count for the cache line placed in the L1 D-cache 73 is equal to one. If it is determined at decision block 219 that the confirmation count is not equal to one, then the history based done bit process replacement scheme 200 skips to decision block 223. However, if it is determined at decision block 219 that the confirmation count is equal to one then the cache line is marked next next least recently used at block 221. This marking of the cache line in L1 D-cache 73 is done in that D-least recently used space 76. The history based done bit process replacement scheme 200 skips to decision block 231.

Next, at decision block 223, it is determined if the confirmation count for the cache line placed in the L1 D-cache 73 is equal to two. If it is determined at decision block 223 that the confirmation count is not equal to two, then the history based done bit process replacement scheme 200 skips to decision block 227. However, if it is determined at decision block 223 that the confirmation count is equal to two then the cache line is marked next least recently used at block 225. This marking of the cache line in L1 D-cache 73 is done in that D-least recently used space 76. The history based done bit process replacement scheme 200 skips to decision block 231.

Next, at decision block 227, it is determined if the confirmation count for the cache line placed in the L1 D-cache 73 is equal to three. If it is determined at decision block 227 that the confirmation count is not equal to three, then the history based done bit process replacement scheme 200 skips to decision block 231. However, if it is determined at decision block 227 that the confirmation count is equal to three then the cache line is marked least recently used at block 229. This marking of the cache line in L1 D-cache 73 is done in that D-least recently used space 76. The history based done bit process replacement scheme 200 proceeds to decision block 231.

At decision block 231, it is determined if the history count is equal to the reference count. If it is determined at decision block 231 that the reference count is not equal to the history count, then the history based done bit process replacement scheme 200 skips to decision block 237. However, if it is determined at decision block 231 that the reference count is equal to the history count, then the history based done bit process replacement scheme 200 increments the confirmation count for the cache line placed into the L1 D-cache 73, at block 233. At block 235, the L1 extended D-directory 120 and count flags including D-history count 121, D-confirmation count 122 and D-change flag 123 are moved to the L2 extended D-directory 110 into count flags D-history count 111, D-confirmation count 112 and D-change flag 113. This is done because it is assumed that cache line being accessed is about to be replaced as it has been utilized the predicted amount, and is ready for replacement in the L1 cache 70. The history based done bit process replacement scheme 200 returns to decision block 201.

At decision block 237, it is determined whether the history count is greater than the reference count. If it is determined at decision block 237 that the history count is not less than the reference count, then the history based done bit process replacement scheme 200 skips the decision block 241. However, if it is determined at decision block 237 at the history count is less than the reference count, then they history based done bit process replacement scheme decrements the confirmation count at block 239 and returns to decision block 201.

At decision block 241, it is determined if the confirmation count has reached its maximum count. If it is determined at decision block 241 that the confirmation count has reached the maximum count, then the history based done bit process replacement scheme 200 returns to block 201. However, if it is determined at decision block 241 that the confirmation count is not equal to the maximum, then the confirmation count for the cache line placed in to the L1 D-cache 73 is incremented at block 243. In one embodiment, the confirmation counter is a saturation counter that does not increment past its maximum count. The history based done bit process replacement scheme 200 then returns to decision block 201.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. An integrated circuit device, comprising:
   a processor core;
   a level one (L1) cache;
   a level two (L2) cache; and
   a history count, kept for each cache line in the L1 cache, the history count for indicating a number of load references to data in the cache line a last time the cache line was called in to the L1 cache; and
   a comparator configured to compare the history count to a reference count to determine when the reference count is equal to the history count, and a confirmation count that corresponds to reliability of an estimate that the cache line in the L1 cache is marked as least recently used, and when the history count equals the reference count, the confirmation count is incremented and an L1 extended cache directory and count flags is moved to an L2 extended cache directory.

2. The integrated circuit device of claim 1, further comprising a counter that counts each time the cache line is referenced in the L1 cache.

3. The integrated circuit device of claim 2, wherein the counter updates a reference counter in the L2 cache each time the cache line is referenced in the L1 cache.

4. The integrated circuit device of claim 3, further comprising a loader that loads the cache line into a data line buffer for access by the processor if the history of access is equal to two.

\* \* \* \* \*